United States Patent
Ishiyama et al.

(10) Patent No.: US 11,073,201 B2
(45) Date of Patent: Jul. 27, 2021

(54) HYDRAULICALLY OPERATED TRANSMISSION

(71) Applicant: Mazda Motor Corporation, Hiroshima (JP)

(72) Inventors: Takashi Ishiyama, Higashihiroshima (JP); Fumitoshi Sato, Nasukarasuyama (JP); Hiroyuki Okayama, Hiroshima (JP); Masuhiro Kawakami, Higashihiroshima (JP); Tomokazu Kinoshita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 102 days.

(21) Appl. No.: 16/347,009

(22) PCT Filed: Nov. 1, 2017

(86) PCT No.: PCT/JP2017/039510
§ 371 (c)(1),
(2) Date: May 2, 2019

(87) PCT Pub. No.: WO2018/088294
PCT Pub. Date: May 17, 2018

(65) Prior Publication Data
US 2019/0271388 A1     Sep. 5, 2019

(30) Foreign Application Priority Data
Nov. 9, 2016   (JP) ............................... JP2016218849

(51) Int. Cl.
*F16H 57/04*   (2010.01)
*F16H 61/00*   (2006.01)

(52) U.S. Cl.
CPC ..... *F16H 57/0473* (2013.01); *F16H 57/0435* (2013.01); *F16H 61/0021* (2013.01); *F16H 2061/0037* (2013.01)

(58) Field of Classification Search
CPC ............ F16H 57/0473; F16H 57/0435; F16H 57/0446; F16H 61/0021; F16H 61/0206;
(Continued)

(56) References Cited

U.S. PATENT DOCUMENTS 5,820,515 A * 10/1998 Fukaya ................... F16H 61/20
                                                                477/92
7,128,688 B2 * 10/2006 Katou ..................... F16D 25/10
                                                                477/98

(Continued)

FOREIGN PATENT DOCUMENTS

| CN | 103269932 A | 8/2013 |
|---|---|---|
| JP | 2003042186 A | 2/2003 |

(Continued)

OTHER PUBLICATIONS

European Patent Office, Extended European Search Report Issued in Application No. 17870491.2, dated Oct. 2, 2019, Germany, 9 pages.

*Primary Examiner* — Bobby Rushing, Jr.
(74) *Attorney, Agent, or Firm* — Alleman Hall Creasman & Tuttle LLP

(57) ABSTRACT

A hydraulically operated transmission includes: a pressure regulator which regulates pressure of a hydraulic oil supplied to a coupling hydraulic chamber of a frictional coupling element for starting a vehicle; and a lubrication control valve provided at a lubricant oil supplying circuit for supplying the lubricant oil to the frictional coupling element.

(Continued)

The lubrication control valve operates, in coupling the frictional coupling element at start of the vehicle, such that the lubricant oil is supplied to the frictional coupling element at a greater flow rate when a regulated pressure regulated by the pressure regulator is lower than a second predetermined pressure, than when the regulated pressure is higher than or equal to the second predetermined pressure. The second predetermined pressure is set to be higher than or equal to a first predetermined pressure, at which the frictional coupling element is completely coupled, and to be lower than a high pressure.

4 Claims, 5 Drawing Sheets

(58) Field of Classification Search
CPC ..... F16H 2061/0037; F16H 2061/0053; F16H 2063/303
See application file for complete search history.

(56) References Cited

U.S. PATENT DOCUMENTS

| | | | |
|---|---|---|---|
| 8,303,463 B2 * | 11/2012 | Sah | F16D 48/02 477/5 |
| 2004/0214686 A1 | 10/2004 | Katou | |
| 2012/0247106 A1 | 10/2012 | Noda et al. | |
| 2012/0247911 A1 | 10/2012 | Noda et al. | |

FOREIGN PATENT DOCUMENTS

| | | |
|---|---|---|
| JP | 2003166558 A | 6/2003 |
| JP | 2004324818 A | 11/2004 |
| JP | 2005106149 A | 4/2005 |
| JP | 2009204067 A | 9/2009 |
| JP | 2012026462 A | 2/2012 |
| KR | 1020140085801 A | 7/2014 |
| KR | 1020190063768 A | 6/2019 |

* cited by examiner

|  | FIRST GEAR | SECOND GEAR | THIRD GEAR | FOURTH GEAR | FIFTH GEAR | SIXTH GEAR | SEVENTH GEAR | EIGHTH GEAR | REVERSE GEAR |
|---|---|---|---|---|---|---|---|---|---|
| CL1 | ○ |  | ○ |  | ○ | ○ | ○ |  |  |
| CL2 |  | ○ | ○ | ○ |  | ○ |  | ○ |  |
| CL3 |  |  |  | ○ | ○ | ○ | ○ | ○ | ○ |
| BR1 | ○ | ○ |  |  |  |  | ○ | ○ | ○ |
| BR2 | ○ | ○ | ○ | ○ | ○ |  |  |  | ○ |

HYDRAULICALLY OPERATED TRANSMISSION

TECHNICAL FIELD

The present invention relates to a hydraulically operated transmission that is installed in a vehicle.

BACKGROUND ART

A hydraulically operated transmission that includes a start clutch having a coupling hydraulic chamber has been known. At the start of the vehicle, the start clutch which has been released is caused to slip and become completely coupled, by supplying hydraulic oil to the coupling hydraulic chamber (see Patent Document 1, for example). To cool and to lubricate the start clutch, lubricant oil is supplied to the start clutch. In a structure in which the amount of lubricant oil to be supplied to the start clutch is not regulated, the amount of lubricant oil required in the most severe condition (e.g., while the start clutch is slipping) is supplied constantly to the start clutch to ensure the reliability. In such a structure, unless a large amount of lubricant oil is required (e.g., after the start clutch becomes completely coupled), an increased amount of energy is lost and the fuel efficiency drops because a larger amount of lubricant oil needs to be stirred by a rotating member of the start clutch.

To address this issue, in Patent Document 1, the amount of lubricant oil to be supplied to the parts to be lubricated, e.g., the mesh between gears or a bearing that holds a rotational axis, is regulated by controlling a reducing valve, and surplus lubricant oil not supplied to the lubricated parts is used in cooling and lubricating the start clutch. The amount of lubricant oil supplied to the start clutch is controlled by controlling the amount of oil discharged from the oil pump.

CITATION LIST

Patent Document

Patent Document 1: Japanese Unexamined Patent Publication No. 2003-166558

SUMMARY OF THE INVENTION

Technical Problem

However, the structure disclosed in Patent Document 1 makes the structure and the control complicated, because the structure needs to control not only the reducing valve but also the oil pump, in order to control the amount of lubricant oil to be supplied to the start clutch.

In view of the foregoing, it is an object of the present invention to simplify the structure for regulating the amount of lubricant oil to be supplied to a frictional coupling element, such as a start clutch, that is included in a hydraulically operated transmission for starting a vehicle.

Solution to the Problem

To achieve the object described above, the present invention is directed to a hydraulically operated transmission installed in a vehicle. The hydraulically operated transmission including: a frictional coupling element for starting the vehicle which includes a coupling hydraulic chamber and which is coupled through supply of a hydraulic oil to the coupling hydraulic chamber at start of the vehicle; a pressure regulator which regulates a pressure of the hydraulic oil supplied to the coupling hydraulic chamber in the frictional coupling element for starting the vehicle; and a lubrication control valve provided at a lubricant oil supplying circuit for supplying the lubricant oil to the frictional coupling element for starting the vehicle. The frictional coupling element for starting the vehicle is configured to be completely coupled when the pressure of the hydraulic oil is higher than or equal to a first predetermined pressure. The pressure regulator is configured to gradually increase the pressure of the hydraulic oil from a low pressure lower than the first predetermined pressure to the first predetermined pressure, and then to a high pressure higher than the first predetermined pressure, in coupling of the frictional coupling element for starting the vehicle at the start of the vehicle. The lubrication control valve is configured to operate based on a differential pressure between the high pressure and a regulated pressure regulated by the pressure regulator, and to operate such that the lubricant oil is supplied to the frictional coupling element for starting the vehicle through the lubricant oil supplying circuit at a greater flow rate when the regulated pressure is lower than a second predetermined pressure set to be higher than or equal to the first predetermined pressure and lower than the high pressure, than when the regulated pressure is higher than or equal to the second predetermined pressure, in the coupling of the frictional coupling element for starting the vehicle at the start of the vehicle.

With the structure described above, the lubrication control valve operates such that the lubricant oil is supplied to the frictional coupling element for starting the vehicle through the lubricant oil supplying circuit at a greater flow rate when the regulated pressure regulated by the pressure regulator is lower than the second predetermined pressure (that is, when the frictional coupling element for starting the vehicle is basically slipping), than when the regulated pressure is higher than or equal to the second predetermined pressure (that is, when the frictional coupling element for starting the vehicle is completely coupled). As a result, a sufficient amount of lubricant oil required in cooling and lubricating the frictional coupling element for starting the vehicle can be supplied to the frictional coupling element for starting the vehicle while the frictional coupling element for starting the vehicle is slipping. On the other hand, after the frictional coupling element for starting the vehicle is completely coupled, the lubrication control valve automatically reduces the amount of the lubricant oil supplied to the frictional coupling element for starting the vehicle in accordance with the increase of the regulated pressure. As a result, it is possible to reduce energy loss which occurs due to stirring of the lubricant oil by a rotating member of the frictional coupling element for starting the vehicle stirring, and is thus possible to reduce a drop in the fuel efficiency. In this manner, the lubrication control valve automatically switches, at an appropriate timing, the flow rate of the lubricant oil to be supplied to the frictional coupling element for starting the vehicle, by utilizing the regulated pressure regulated by the pressure regulator. Therefore, the amount of lubricant oil to be supplied to the frictional coupling element for starting the vehicle can be regulated with a simple structure.

In the hydraulically operated transmission described above, it is preferable that the lubricant oil supplying circuit includes a large-diameter orifice-installed oil passage and a small-diameter orifice-installed oil passage connected in parallel with each other and respectively provided with a large-diameter orifice and a small-diameter orifice having orifice diameters different from each other; that the lubrication control valve is provided at the large-diameter orifice-installed oil passage; and that the lubrication control valve is configured to open the large-diameter orifice-installed oil passage when the regulated pressure is lower than the second predetermined pressure, and to block the large-diameter orifice-installed oil passage when the regulated pressure is higher than or equal to the second predetermined pressure.

With this configuration, the large-diameter orifice-installed oil passage is blocked when the regulated pressure is higher than or equal to the second predetermined pressure. Therefore, the lubricant oil passes only through the small-diameter orifice-installed oil passage, and flows into the frictional coupling element for starting the vehicle. As a result, a smaller amount of lubricant oil is supplied to the frictional coupling element for starting the vehicle. By contrast, the large-diameter orifice-installed oil passage is open when the regulated pressure is lower than the second predetermined pressure. Therefore, the lubricant oil passes through both of the large-diameter orifice-installed oil passage and the small-diameter orifice-installed oil passage, and flows into the frictional coupling element for starting the vehicle. As a result, a larger amount of lubricant oil is supplied to the frictional coupling element for starting the vehicle. Hence, the amount of lubricant oil to be supplied to the frictional coupling element for starting the vehicle can be regulated in a specific and simplified manner.

In the hydraulically operated transmission, the frictional coupling element for starting the vehicle is preferably a brake.

With this configuration, a large amount of lubricant oil can be supplied more easily to the frictional coupling element for starting the vehicle, compared with a case in which the frictional coupling element for starting the vehicle is a clutch. Specifically, in the case in which the frictional coupling element for starting the vehicle is a clutch, the lubricant oil needs to be supplied to the frictional coupling element for starting the vehicle via an input shaft extending along the axial direction of the hydraulically operated transmission, and via the rotating members or the like provided around the input shaft. Therefore, there is a limitation with regard to the size of the cross-sectional area of the oil passage. By contrast, in the case in which the frictional coupling element for starting the vehicle is a brake, the lubricant oil can be supplied to the frictional coupling element for starting the vehicle (brake) directly from the wall of the transmission casing. Therefore, a relatively large oil passage diameter can be ensured. As a result, a sufficient amount of lubricant oil can be easily supplied to the frictional coupling element for starting the vehicle when the frictional coupling element for starting the vehicle is slipping. Furthermore, unlike a clutch, a brake does not require consideration of a centrifugal oil pressure of the hydraulic oil supplied to the coupling hydraulic chamber of the frictional coupling element for starting the vehicle. Therefore, a centrifugal balancing chamber for cancelling the centrifugal oil pressure is not required.

Advantages of the Invention

As described above, according to a hydraulically operated transmission of the present invention, the lubrication control valve automatically switches, at an appropriate timing, a flow rate of a lubricant oil to be supplied to a frictional coupling element for starting a vehicle, by utilizing a regulated pressure regulated by a pressure regulator. The amount of lubricant oil to be supplied to the frictional coupling element for starting the vehicle can thus be regulated with a simple structure.

DESCRIPTION OF EMBODIMENTS

An exemplary embodiment will be described in detail below with reference to the drawings.

Figures 1, 2:
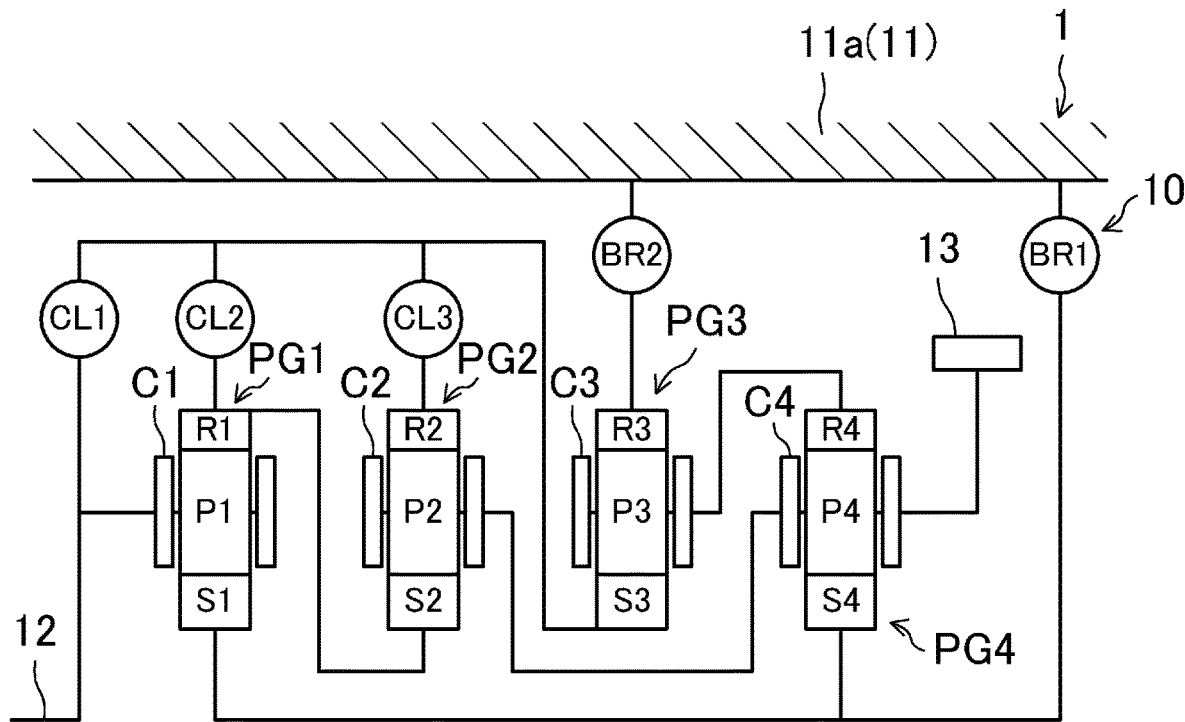
FIG. 1 is a schematic illustrating an outline of a hydraulically operated transmission according to an exemplary embodiment.
FIG. 2 is a coupling table indicating frictional coupling elements that are coupled in each transmission gear in the hydraulically operated transmission.

FIG. 1 illustrates a hydraulically operated transmission 1 (hereinafter, referred to as a transmission 1) according to the exemplary embodiment. The transmission 1 is an automatic transmission installed in a vehicle, and achieving eight forward speeds and one reverse speed. The transmission 1 includes a tubular transmission casing 11, and a transmission mechanism 10 which is installed inside the transmission casing 11, and which receives driving power from a driving source not illustrated (such as an engine or a motor).

The transmission mechanism 10 includes an input shaft 12 corresponding to an input unit of the transmission 1, and an output gear 13 corresponding to an output unit of the transmission 1. The input shaft 12 is connected directly to the output shaft of the driving source. In other words, in this embodiment, there is no torque converter provided between the output shaft of the driving source and the input shaft 12 of the transmission 1. In this embodiment, the driving source and the transmission 1 are joined to each other, and installed in the vehicle in an orientation in which the output shaft of the driving source and the input shaft 12 extend along the width direction of the vehicle. The output gear 13 is provided at a portion of the transmission casing 11 on the side (the right side in FIG. 1) opposite to the driving source side. The driving power is transmitted to the output gear 13, and input to the input gear of a differential mechanism via a counter-shaft input gear and a counter-shaft output gear that are provided on a counter shaft. The counter shaft extends in parallel with the input shaft 12. The driving power is then transmitted to driving wheels (front wheels) of the vehicle via the differential mechanism.

The transmission mechanism 10 also includes a first planetary gear set PG1 (hereinafter, referred to as a first gear set PG1), a second planetary gear set PG2 (hereinafter, referred to as a second gear set PG2), a third planetary gear set PG3 (hereinafter, referred to as a third gear set PG3), and a fourth planetary gear set PG4 (hereinafter, referred to as a fourth gear set PG4) that are aligned in the axial direction of the input shaft 12 (which is also the axial direction of the transmission 1). The first gear set PG1, second gear set PG2, third gear set PG3, and fourth gear set PG4 are arranged between the input shaft 12 and the output gear 13, in the order listed herein, from the driving source side. These gear sets constitute a plurality of paths in which the driving power is transmitted from the input shaft 12 to the output gear 13. The input shaft 12, the output gear 13, and the first to fourth gear sets PG1 to PG4 are coaxially positioned.

The transmission mechanism 10 also includes five frictional coupling elements (a first clutch CL1, a second clutch CL2, a third clutch CL3, a first brake BR1, and a second brake BR2) for selecting and switching to one of the paths formed by the first to fourth gear sets PG1 to PG4 and transmitting the driving power.

The first gear set PG1 includes a first sun gear S1, a first ring gear R1, and a first carrier C1 as rotating elements. The first gear set PG1 is a single-pinion gear set. A plurality of pinions P1 supported by the first carrier C1 are arranged apart from one another along the circumferential direction of the first gear set PG1, and meshed with both of the first sun gear S1 and the first ring gear R1.

The second gear set PG2 includes a second sun gear S2, a second ring gear R2, and a second carrier C2 as rotating elements. The second gear set PG2 is also a single-pinion gear set. A plurality of pinions P2 supported by the second carrier C2 are arranged apart from each other along the circumferential direction of the second gear set PG2, and meshed with both of the second sun gear S2 and the second ring gear R2.

The third gear set PG3 includes a third sun gear S3, a third ring gear R3, and a third carrier C3 as rotating elements. The third gear set PG3 is also a single-pinion gear set. A plurality of pinions P3 supported by the third carrier C3 are arranged apart from each other along the circumferential direction of the third gear set PG3, and meshed with both of the third sun gear S3 and the third ring gear R3.

The fourth gear set PG4 includes a fourth sun gear S4, a fourth ring gear R4, and a fourth carrier C4 as rotating elements. The fourth gear set PG4 is also a single-pinion gear set. A plurality of pinions P4 supported by the fourth carrier C4 are arranged apart from each other along the circumferential direction of the fourth gear set PG4, and meshed with both of the fourth sun gear S4 and the fourth ring gear R4.

The first sun gear S1 and the fourth sun gear S4 remain connected with each other. The first ring gear R1 and the second sun gear S2 remain connected with each other. The second carrier C2 and the fourth carrier C4 remain connected with each other, and the third carrier C3 and the fourth ring gear R4 remain connected with each other. The input shaft 12 remains connected with the first carrier C1. The output gear 13 remains connected with the second carrier C2 and the fourth carrier C4.

The first clutch CL1 is configured to disconnect the input shaft 12 and the first carrier C1 from the third sun gear S3. The first clutch CL1 is positioned at the end of the driving source side of the transmission casing 11 and near the circumferential wall 11a of the transmission casing 11.

The second clutch CL2 is configured to disconnect the first ring gear R1 and the second sun gear S2 from the third sun gear S3. The second clutch CL2 is positioned on the outer side of the first ring gear R1 in the radial direction and near the circumferential wall 11a of the transmission casing 11.

The third clutch CL3 is configured to disconnect the second ring gear R2 from the third sun gear S3. The third clutch CL3 is positioned on the outer side of the second ring gear R2 in the radial direction and near the circumferential wall 11a of the transmission casing 11.

The first brake BR1 is configured to disconnect the first sun gear S1 and the fourth sun gear S4 from the transmission casing 11. The first brake BR1 is positioned at the end of the side opposite to the driving source side of the transmission casing 11 and near the circumferential wall 11a of the transmission casing 11.

The second brake BR2 is configured to disconnect the third ring gear R3 from the transmission casing 11. The second brake BR2 is positioned on the outer side of the third ring gear R3 in the radial direction and near the circumferential wall 11a of the transmission casing 11.

Each of these frictional coupling elements is coupled when the hydraulic oil is supplied to a coupling hydraulic chamber of the frictional coupling element. As illustrated in a coupling table in FIG. 2, by selectively coupling three out of the five frictional coupling elements, first to eighth forward gears and one reverse gear are formed. In the coupling table illustrated in FIG. 2, circles indicate the frictional coupling elements that are coupled, and blanks indicate the frictional coupling elements that are de-coupled (released).

Specifically, the first gear is formed by coupling the first clutch CL1, the first brake BR1, and the second brake BR2. The second gear is formed by coupling the second clutch CL2, the first brake BR1, and the second brake BR2. The third gear is formed by coupling first clutch CL1, the second clutch CL2, and the second brake BR2. The fourth gear is formed by coupling the second clutch CL2, the third clutch CL3, and the second brake BR2. The fifth gear is formed by coupling the first clutch CL1, the third clutch CL3, and the second brake BR2. The sixth gear is formed by coupling the first clutch CL1, the second clutch CL2, and the third clutch CL3. The seventh gear is formed by coupling the first clutch CL1, the third clutch CL3, and the first brake BR1. The eighth gear is formed by coupling the second clutch CL2, the third clutch CL3, and the first brake BR1. The reverse gear is formed by coupling the third clutch CL3, the first brake BR1, and the second brake BR2. In the sixth gear, the revolving speed of the input shaft 12 is the same as that of the output gear 13.

In this embodiment, the second brake BR2 corresponds to a frictional coupling element for starting a vehicle. In other words, at the start of the vehicle, the second brake BR2 which has been released is caused to slip and then to become completely coupled, by coupling the first clutch CL1 and the first brake BR1 and thereafter supplying the hydraulic oil to a coupling hydraulic chamber 21 of the second brake BR2 (see FIG. 3).

Figure 3:
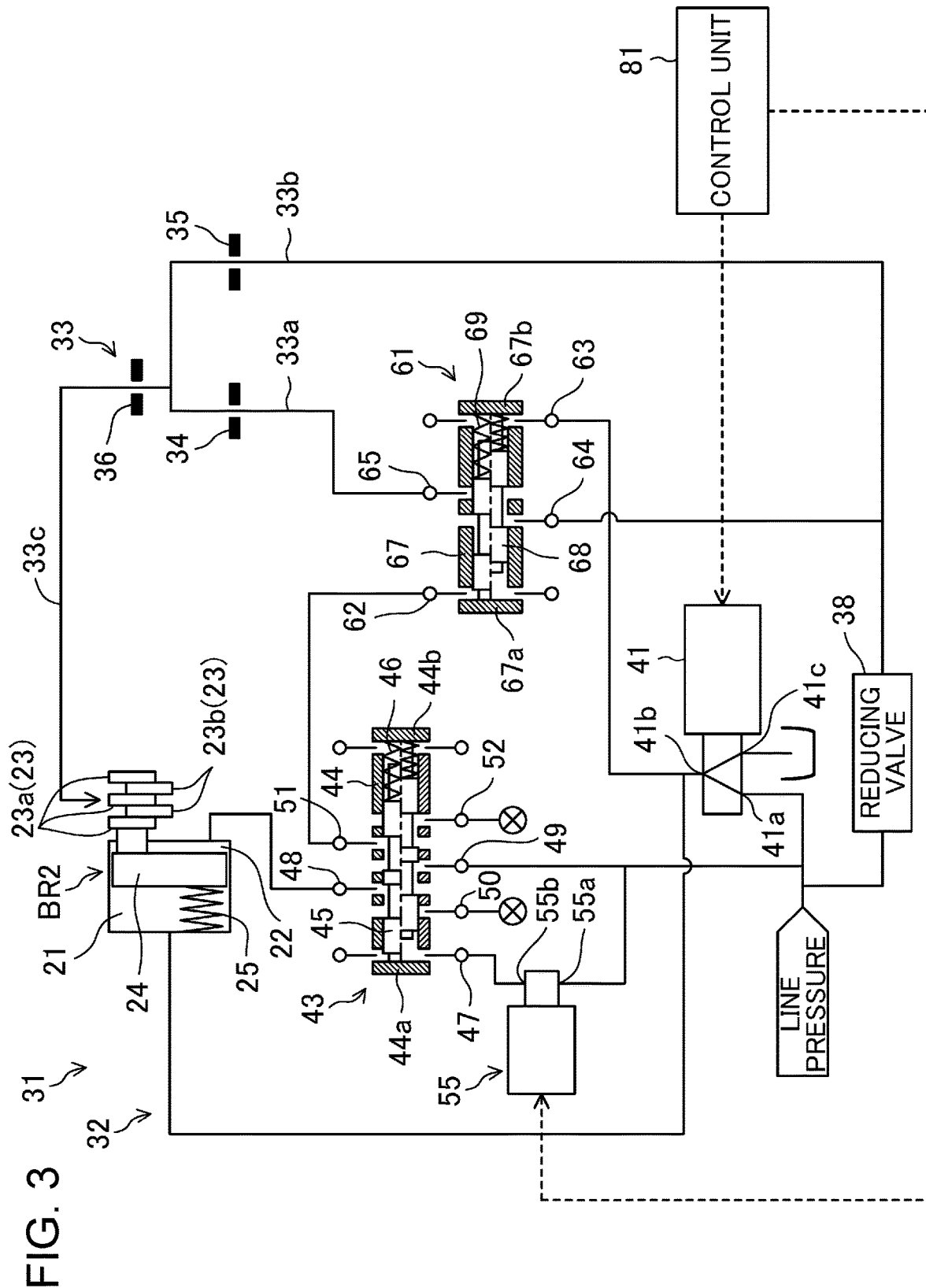
FIG. 3 is a circuit diagram illustrating a part of a hydraulic control circuit included in the hydraulically operated transmission.

FIG. 3 illustrates a part of a hydraulic control circuit 31 in the transmission 1. The hydraulic control circuit 31 includes a hydraulic oil supplying circuit 32 for supplying the hydraulic oil to the second brake BR2 (the coupling hydraulic chamber 21 and a releasing hydraulic chamber 22, which will be described later), and a lubricant oil supplying circuit 33 for supplying lubricant oil to the second brake BR2. The hydraulic oil and the lubricant oil are oil discharged from an oil pump not illustrated. Depictions of hydraulic oil supplying circuits and lubricant oil supplying circuits for supplying the hydraulic oil and the lubricant oil to the frictional coupling elements other than the second brake BR2 are omitted.

As simply illustrated in FIG. 3, the second brake BR2 includes a plurality of friction plates 23 that are provided side by side along the axial direction of the transmission 1, a piston 24, and the coupling hydraulic chamber 21 and the releasing hydraulic chamber 22 having the piston 24 interposed therebetween. Among the friction plates 23, alternately positioned friction plates 23a are connected to the transmission casing 11, and the other friction plates 23b are connected to the third ring gear R3. The friction plates 23a and the friction plates 23b slide against one another while the second brake BR2 is slipping. In coupling the second brake BR2, the hydraulic oil is supplied to the coupling hydraulic chamber 21 to cause the piston 24 to press the friction plates 23a and the friction plates 23b in the axial direction of the transmission 1 so that the friction plates are engaged with one another.

In this embodiment, to accelerate the coupling of the second brake BR2 (the engagement of the friction plates 23a and the friction plates 23b), the second brake BR2 further includes a spring 25 for applying a bias force at a level enough to bring the friction plates 23a and the friction plates 23b into contact with one another. The biasing force of the spring 25 alone is not enough to make the friction plates 23a and the friction plates 23b engaged with one another to a degree that allows transmission of the driving power. Therefore, by supplying the hydraulic oil to the coupling hydraulic chamber 21, the friction plates 23a and the friction plates 23b become engaged with one another, and the second brake BR2 is coupled. The second brake BR2 is completely coupled when the pressure of the hydraulic oil supplied to the coupling hydraulic chamber 21 becomes equal to or higher than a first predetermined pressure. The first predetermined pressure is set to a level lower than the line pressure. The second brake BR2 is released when the hydraulic oil is drained from the coupling hydraulic chamber 21 and when the hydraulic oil (at the line pressure) is supplied to the releasing hydraulic chamber 22.

The hydraulic oil supplying circuit 32 includes a pressure-regulating solenoid valve 41, as a pressure regulator for regulating the pressure of the hydraulic oil to be supplied to the coupling hydraulic chamber 21 of the second brake BR2. The pressure-regulating solenoid valve 41 is configured as a linear solenoid valve.

The oil pump inputs the hydraulic oil at the line pressure to an inlet port 41a of the pressure-regulating solenoid valve 41. Hydraulic oil having the pressure reduced from the line pressure (including zero pressure) or the hydraulic oil at the line pressure is output from an outlet port 41b. Surplus hydraulic oil resultant of reducing the pressure by the pressure-regulating solenoid valve 41 is drained from a drain port 41c. The hydraulic oil output from the outlet port 41b of the pressure-regulating solenoid valve 41 is then supplied to the coupling hydraulic chamber 21. The pressure of the hydraulic oil output from the outlet port 41b (the pressure regulated by the pressure-regulating solenoid valve 41) varies within a range from zero to the line pressure. The hydraulic oil output from the outlet port 41b is also supplied to a second control port 63 of a lubrication control valve 61, which will be described later. Note that the line pressure is a pressure of the hydraulic oil discharged from the oil pump and regulated by a regulator valve (not illustrated), and serves as the source pressure of the entire hydraulic oil and lubricant oil that are required in the transmission 1.

The pressure-regulating solenoid valve 41 is configured to switch between supplying and not supplying the hydraulic oil to the coupling hydraulic chamber 21 of the second brake BR2. The pressure-regulating solenoid valve 41 is also configured, in coupling the second brake BR2 at the start of the vehicle, to gradually increase the pressure (the regulated pressure) of the hydraulic oil to be supplied to the coupling hydraulic chamber 21, from a low pressure below the first predetermined pressure to the first predetermined pressure and thereafter to a high pressure above the first predetermined pressure. In this embodiment, the low pressure is zero, and the high pressure is the line pressure. The pressure-regulating solenoid valve 41 sets the regulated pressure to zero when no hydraulic oil is to be supplied to the coupling hydraulic chamber 21. At this time, the hydraulic oil in the coupling hydraulic chamber 21 is drained. In order to couple the second brake BR2 in a situation other than the start of the vehicle, the pressure-regulating solenoid valve 41 quickly increases the regulated pressure to the line pressure from zero.

In this embodiment, the pressure is quickly increased from the first predetermined pressure to the line pressure in coupling the second brake BR2 at the start of the vehicle. However, the pressure may be increased gradually subsequently to the quickly increasing the pressure to the first predetermined pressure. Alternatively, the regulated pressure may be quickly increased from zero to the low pressure (in this example, a pressure higher than zero but close to zero) and thereafter may be gradually increased from the low pressure to the first predetermined pressure.

The hydraulic oil supplying circuit 32 further includes a switching valve 43 for switching between supplying and not supplying the hydraulic oil to the releasing hydraulic chamber 22 of the second brake BR2. The switching valve 43 switches between supplying and not supplying the hydraulic oil to the releasing hydraulic chamber 22 in response to an operation of an ON/OFF solenoid valve 55.

Specifically, the hydraulic oil at the line pressure is input to the inlet port 55a of the ON/OFF solenoid valve 55. When the ON/OFF solenoid valve 55 is switched ON, the hydraulic oil at the line pressure is output from an outlet port 55b, while maintaining the line pressure. When the ON/OFF solenoid valve 55 is switched OFF, the flow of the hydraulic oil is disrupted, so that no hydraulic oil is output from the outlet port 55b. The ON/OFF solenoid valve 55 is switched OFF for the transmission gears in which the second brake BR2 is coupled (the first to fifth gears and the reverse gear). The ON/OFF solenoid valve 55 is switched ON for the transmission gears in which the second brake BR2 is released (the sixth to eighth gears).

The switching valve 43 includes a spool 45 housed in a sleeve 44. The spool 45 is movable between a first position where the spool 45 abuts against an end wall 44a on one end of the sleeve 44 (the end wall on the left side in FIG. 3) and a second position where the spool 45 abuts against an end wall 44b on the other end of the sleeve 44 (the end wall on the right side in FIG. 3) in the axial direction of the spool 45. A compressed coil spring 46 for biasing the spool 45 toward the first position is provided at the other end of the sleeve 44 where the second position is located.

A control port 47 connected to the outlet port 55b of the ON/OFF solenoid valve 55 is provided at the one end of the sleeve 44 where the first position is located. When the ON/OFF solenoid valve 55 is switched OFF, no hydraulic oil at the line pressure is supplied to the control port 47, so that the spool 45 is maintained at the first position due to the biasing force of the compressed coil spring 46. When the ON/OFF solenoid valve 55 is switched ON, the hydraulic oil at the line pressure is supplied to the control port 47, so that the spool 45 is moved to the second position against the biasing force of the compressed coil spring 46.

When the spool 45 is located at the second position (when the ON/OFF solenoid valve 55 is ON), a port 48 connected to the releasing hydraulic chamber 22 of the second brake BR2 communicates with a port 49 to which the hydraulic oil at the line pressure is supplied. As a result, the hydraulic oil at the line pressure is supplied to the releasing hydraulic chamber 22. When the spool 45 is located at the first position (when the ON/OFF solenoid valve 55 is OFF), the port 48 connected to the releasing hydraulic chamber 22 communicates with a drain port 50. As a result, the hydraulic oil in the releasing hydraulic chamber 22 is drained.

The operations of the pressure-regulating solenoid valve 41 and the ON/OFF solenoid valve 55 are controlled by a control unit 81. The control unit 81 is a controller using a known microcomputer as a base element, and includes: a central processing unit (CPU) that executes computer programs (including a basic control program such as an operating system (OS), and an application program started on the OS and implements a specific function); a memory which is implemented, for example, as a random access memory (RAM) or a read-only memory (ROM) and which stores the computer programs and data; and an input/output (I/O) bus for inputting and outputting electric signals.

The control unit 81 receives inputs of various types of information allowing the transmission gears of the transmission 1 to be automatically switched based on the driving conditions of the vehicle (e.g., information pertaining to a range position of a shift lever, the accelerator position, and the speed of the vehicle). Based on these pieces of information received, the control unit 81 controls the pressure-regulating solenoid valve 41 and the ON/OFF solenoid valve 55, and controls the valves that are provided in the hydraulic oil supplying circuits and the lubricant oil supplying circuits leading to the frictional coupling elements other than the second brake BR2.

In this embodiment, when the spool 45 of the switching valve 43 is located at the first position, that is, in the transmission gears coupling the second brake BR2, the port 49 receiving the supply of the hydraulic oil at the line pressure communicates with a port 51 connected to a first control port 62 of the lubrication control valve 61 provided in the lubricant oil supplying circuit 33 (specifically, in a large-diameter orifice-installed oil passage 33a, which will be described later). As a result, the hydraulic oil at the line pressure is supplied to the first control port 62 of the lubrication control valve 61. When the spool 45 of the switching valve 43 is located at the second position, that is, in the transmission gears releasing the second brake BR2, the port 51 connected to the first control port 62 of the lubrication control valve 61 communicates with a drain port 52. As a result, the hydraulic oil in the first control port 62 is drained.

The lubricant oil supplying circuit 33 includes a large-diameter orifice-installed oil passage 33a and a small-diameter orifice-installed oil passage 33b that are connected to each other in parallel. The large-diameter orifice-installed oil passage 33a and the small-diameter orifice-installed oil passage 33b are provided with a large-diameter orifice 34 and a small-diameter orifice 35, respectively, which have diameters different from each other. A flow rate of the lubricant oil flowing through the large-diameter orifice-installed oil passage 33a is greater than a flow rate of the lubricant oil flowing through the small-diameter orifice-installed oil passage 33b.

The lubricant oil, the pressure of which has been reduced by the reducing valve 38 from the line pressure to a set pressure (a pressure suitable for lubrication) which is set beforehand, is supplied to the large-diameter orifice-installed oil passage 33a and the small-diameter orifice-installed oil passage 33b. The downstream ends of the large-diameter orifice-installed oil passage 33a and the small-diameter orifice-installed oil passage 33b are merged to be a merged oil passage 33c, and the lubricant oil is supplied to the second brake BR2 (particularly to the friction plates 23) via the merged oil passage 33c. The merged oil passage 33c passes through the circumferential wall 11a of the transmission casing 11, and reaches the second brake BR2. An orifice 36 is provided at the merged oil passage 33c, as well. The orifice diameter of this orifice 36 is larger than that of the large-diameter orifice 34 provided at the large-diameter orifice-installed oil passage 33a. Thus, lubricant oil in an amount substantially equal to the sum of the amount of the lubricant oil in the large-diameter orifice-installed oil passage 33a and the amount of the lubricant oil in the small-diameter orifice-installed oil passage 33b flows through the merged oil passage 33c.

The lubrication control valve 61 is provided at the large-diameter orifice-installed oil passage 33a. Two ports 64 and 65 of the lubrication control valve 61 are connected to upstream and downstream portions of the large-diameter orifice-installed oil passage 33a, respectively. The upstream portion and the downstream portion communicate with each other, or are blocked from each other, by the operations of the lubrication control valve 61.

The lubrication control valve 61 includes a spool 68 housed in a sleeve 67. The spool 68 is movable between a first position where the spool 68 abuts against an end wall 67a on one end of the sleeve 67 (the end wall on the left side in FIG. 3) and a second position where the spool 68 abuts against an end wall 67b on the other end of the sleeve 67 (the end wall on the right side in FIG. 3) in the axial direction of the spool 68. A compressed coil spring 69 for biasing the spool 68 toward the first position is provided at the other end of the sleeve 67 where the second position is located.

When the spool 68 of the lubrication control valve 61 is located at the second position, the two ports 64 and 65 communicate with each other. As a result, the upstream portion and the downstream portion of the large-diameter orifice-installed oil passage 33a communicate with each other (i.e., the large-diameter orifice-installed oil passage 33a is open). When the spool 68 is located at the first position, the two ports 64 and 65 do not communicate with each other. As a result, the upstream portion and the downstream portion of the large-diameter orifice-installed oil passage 33a are blocked (i.e., the large-diameter orifice-installed oil passage 33b is blocked).

The first control port 62 is provided at the one end of the sleeve 67 where the first position is located. The second control port 63 is provided at the other end of the sleeve 67 where the second position is located. The second control port 63 is connected to the outlet port 41b of the pressure-regulating solenoid valve 41. The lubrication control valve 61 (the spool 67) operates based on the differential pressure between the hydraulic oil pressure at the first control port 62 and the hydraulic oil pressure at the second control port 63. Specifically, the lubrication control valve 61 operates according to a magnitude relationship between the biasing force of the compressed coil spring 69 and a value obtained by subtracting, from a pressing force toward the spool 68 which is converted from the hydraulic oil pressure at the first control port 62, a pressing force toward the spool 68 which is converted from the hydraulic oil pressure at the second control port 63.

Figure 4:
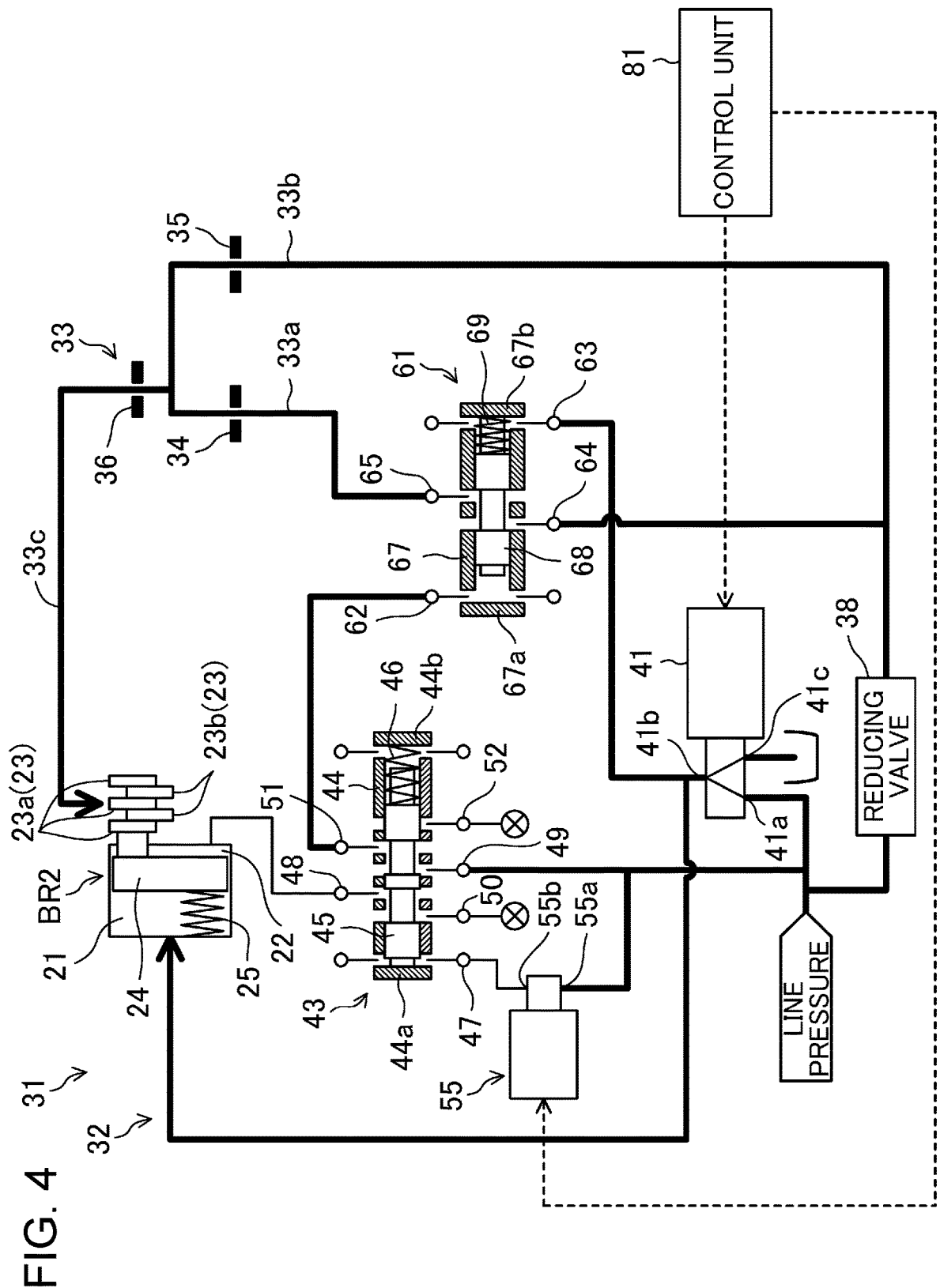
FIG. 4 is a schematic corresponding to FIG. 3, illustrating a condition in which hydraulic oil at a line pressure is supplied to a first control port of a lubrication control valve, and the hydraulic oil at a regulated pressure regulated by a pressure-regulating solenoid valve (at a level lower than a second predetermined pressure) is supplied to a second control port of the lubrication control valve.
Figure 5:
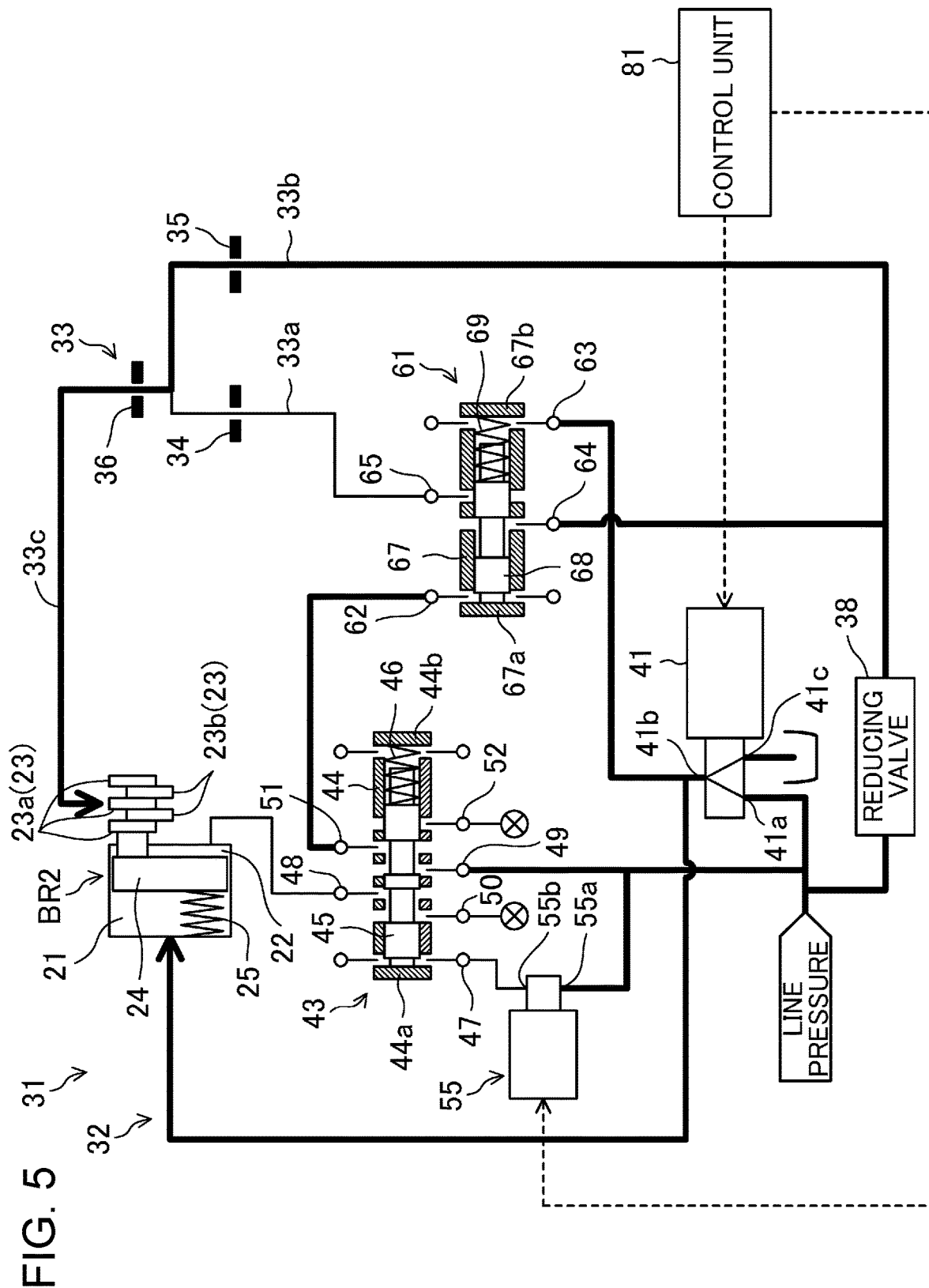
FIG. 5 is a schematic corresponding to FIG. 3, illustrating a condition in which the hydraulic oil at the line pressure is supplied to the first control port of the lubrication control valve, and the hydraulic oil at a regulated pressure regulated by the pressure-regulating solenoid valve (at a level equal to or higher than the second predetermined pressure) is supplied to the second control port of the lubrication control valve.

As described above, in the transmission gears coupling the second brake BR2, the hydraulic oil at the line pressure is supplied to the first control port 62 of the lubrication control valve 61 via the switching valve 43, and the hydraulic oil at the regulated pressure is supplied to the second control port 63 via the pressure-regulating solenoid valve 41. In coupling the second brake BR2 at the start of the vehicle, the regulated pressure is gradually increased from zero to the first predetermined pressure, and then increased quickly to the line pressure. To this end, the lubrication control valve 61 is configured such that the spool 68 is located at the second position when the regulated pressure is lower than the second predetermined pressure (which is set to be higher than or equal to the first predetermined pressure and lower than the line pressure) as illustrated in FIG. 4, and such that the spool 68 is located at the first position when the regulated pressure is higher than or equal to the second predetermined pressure as illustrated in FIG. 5. In this manner, the lubrication control valve 61 operates according to the differential pressure between the line pressure and the regulated pressure, in coupling the second brake BR2 at the start of the vehicle.

In coupling the second brake BR2 at the start of the vehicle, the second brake BR2 which has been released is caused to slip and become completely coupled by gradually increasing the regulated pressure from zero to the first predetermined pressure. As a result, the vehicle can start smoothly even if there is no torque converter provided between the output shaft of the driving source and the input shaft 12 of the transmission 1.

Figure 6:
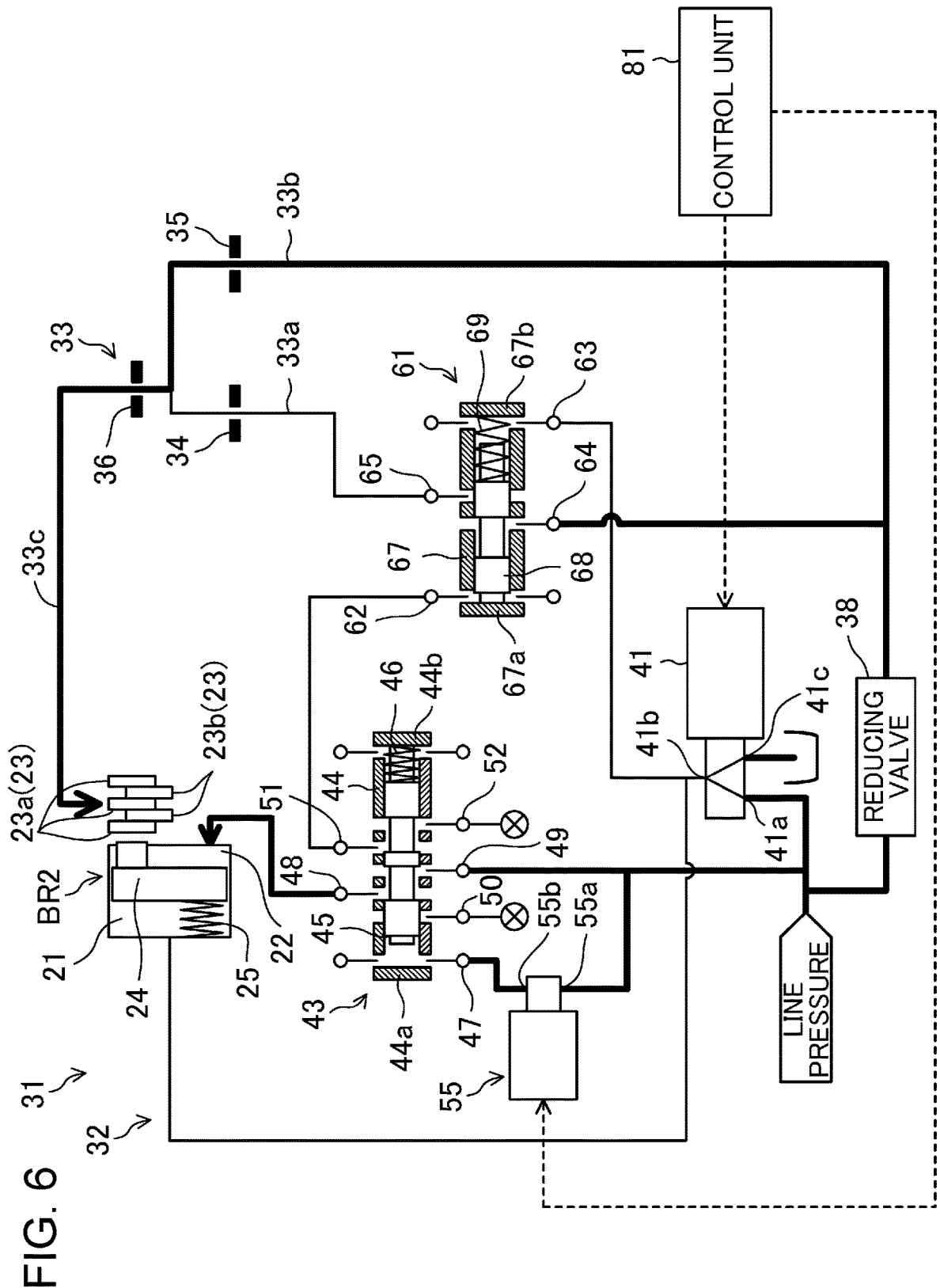
FIG. 6 is a schematic corresponding to FIG. 3, illustrating a condition in which the hydraulic oil is supplied to neither one of the first control port and the second control port of the lubrication control valve.

In this manner, in coupling the second brake BR2 at the start of the vehicle, the spool 68 is located at the second position when the regulated pressure is lower than the second predetermined pressure, so that the large-diameter orifice-installed oil passage 33a is open. As a result, as illustrated in FIG. 4, the lubricant oil from the reducing valve 38 passes through both of the large-diameter orifice-installed oil passage 33a and the small-diameter orifice-installed oil passage 33b, and is supplied to the second brake BR2. In FIGS. 4 to 6, the paths through which the hydraulic oil and the lubricant oil flow are indicated by thick lines.

When the regulated pressure reaches or exceeds the second predetermined pressure in coupling the second brake BR2 at the start of the vehicle, the spool 68 is moved to the first position, and the large-diameter orifice-installed oil passage 33a is therefore blocked. As a result, as illustrated in FIG. 5, the lubricant oil from the reducing valve 38 passes only through the small-diameter orifice-installed oil passage 33b, and is supplied to the second brake BR2.

Thus, in coupling the second brake BR2 at the start of the vehicle, the lubrication control valve 61 is operated such that the lubricant oil is supplied to the second brake BR2 through the lubricant oil supplying circuit 33 at a greater flow rate when the regulated pressure is lower than the second predetermined pressure, than when the regulated pressure is higher than or equal to the second predetermined pressure. That is, a sufficient amount of lubricant oil required to cool and lubricate the second brake BR2 (particularly the friction plates 23) is supplied to the second brake BR2 while the second brake BR2 is slipping. On the other hand, a large amount of lubricant oil is no longer necessary after the second brake BR2 is completely coupled. The flow rate of the lubricant oil supplied to the second brake BR2 is therefore reduced.

The second predetermined pressure may be the same as the first predetermined pressure. Preferably, however, the second predetermined pressure is greater than the first predetermined pressure so that block the large-diameter orifice-installed oil passage 33a is blocked after ensuring the complete coupling of the second brake BR2. In such a case, it is preferable to set the second predetermined pressure as close to the first predetermined pressure as possible, from the viewpoint of blocking the large-diameter orifice-installed oil passage 33a as quickly as possible.

In coupling the second brake BR2 in a different situation other than the start of the vehicle, the regulated pressure is quickly increased from zero to the line pressure. The spool 68 is therefore quickly moved to the first position. As a result, the large-diameter orifice-installed oil passage 33a basically remains closed, and the lubricant oil from the reducing valve 38 passes only through the small-diameter orifice-installed oil passage 33b, and is supplied to the second brake BR2 (see FIG. 5).

When the second brake BR2 is not be coupled, the hydraulic oil is drained without being supplied to the first and second control ports 62 and 63 at all (that is, the pressures of the hydraulic oil at the first and second control ports 62 and 63 are both zero). Therefore, the spool 68 remains at the first position due to the compressed coil spring 69, as illustrated in FIG. 6. In this case, as well, the lubricant oil from the reducing valve 38 passes only through the small-diameter orifice-installed oil passage 33b, and is supplied to the second brake BR2. When the second brake BR2 is not coupled, the hydraulic oil is not supplied to the coupling hydraulic chamber 21 of the second brake BR2, and is supplied to the releasing hydraulic chamber 22.

Thus, in this embodiment, in coupling the second brake BR2 at the start of the vehicle, the lubrication control valve 61 is operated such that the lubricant oil is supplied to the second brake BR2 through the lubricant oil supplying circuit 33 at a greater flow rate when the regulated pressure is lower than the second predetermined pressure, than when the regulated pressure is higher than or equal to the second predetermined pressure. That is, a sufficient amount of lubricant oil required in the second brake BR2 can be supplied to the second brake BR2 while the second brake BR2 is slipping. On the other hand, after the second brake BR2 is completely coupled, the lubrication control valve 61 automatically reduces the flow rate of the lubricant oil flowing to the second brake BR2 in accordance with the increase of the regulated pressure. It is therefore possible to reduce energy loss which occurs due to stirring of the lubricant oil by the second brake BR2, particularly by the friction plates 23b, and reduce a drop in the fuel efficiency. In this manner, the lubrication control valve 61 automatically switches, at an appropriate timing, the flow rate of the lubricant oil to be supplied to the second brake BR2, by utilizing the regulated pressure regulated by the pressure-regulating solenoid valve 41. Therefore, the amount of lubricant oil to be supplied to the second brake BR2 can be regulated with a simple structure.

The present invention is not limited to the embodiment described above, and various substitutions are possible within the scope not deviating from the essence of the claims.

For example, an example has been described in the above embodiment in which the frictional coupling element for starting a vehicle is configured as the second brake BR2.

However, the frictional coupling element for starting a vehicle may be any frictional coupling element that is coupled in the first gear. In the structure of the transmission 1 according to the above embodiment, the frictional coupling element for starting a vehicle may also be the first clutch CL1 or the first brake BR1. However, the frictional coupling element for starting a vehicle is preferably a brake, among the choices from a clutch or a brake. In a case in which the frictional coupling element for starting a vehicle is configured as a brake, the lubricant oil can be supplied directly to the frictional coupling element for starting a vehicle (brake) from the circumferential wall 11a of the transmission casing 11, which makes it possible to ensure a relatively large diameter of the oil passage. This configuration allows a sufficient amount of lubricant oil to be easily supplied to the frictional coupling element for starting a vehicle, while the frictional coupling element for starting a vehicle is slipping.

The embodiment described above is merely illustrative, and is not intended to limit the interpretation of the scope of the present invention in any way. The scope of the present invention is defined by the appended claims, and any modifications or changes falling within the scope of equivalency of the claims are therefore intended to be embraced therein.

INDUSTRIAL APPLICABILITY

The present invention is useful for a hydraulically operated transmission including a frictional coupling element for starting a vehicle which includes a coupling hydraulic chamber and which is coupled through supply of a hydraulic oil to the coupling hydraulic chamber at start of a vehicle.

DESCRIPTION OF REFERENCE CHARACTERS

1 Hydraulically Operated Transmission
33 Lubricant Oil Supplying Circuit
33a Large-Diameter Orifice-Installed Oil Passage
33b Small-Diameter Orifice-Installed Oil Passage
34 Large-Diameter Orifice
35 Small-Diameter Orifice
41 Pressure-Regulating Solenoid Valve (Pressure Regulator)
61 Lubrication Control Valve
BR2 Second Brake (Frictional Coupling Element for Starting a Vehicle)

The invention claimed is:

1. A hydraulically operated transmission installed in a vehicle, the hydraulically operated transmission comprising:
a frictional coupling element for starting the vehicle which includes a coupling hydraulic chamber and which is coupled through supply of a hydraulic oil to the coupling hydraulic chamber at start of the vehicle;
a pressure regulator which regulates a pressure of the hydraulic oil supplied to the coupling hydraulic chamber in the frictional coupling element for starting the vehicle; and
a lubrication control valve provided at a lubricant oil supplying circuit for supplying the lubricant oil to the frictional coupling element for starting the vehicle, wherein
the frictional coupling element for starting the vehicle is configured to be completely coupled when the pressure of the hydraulic oil is higher than or equal to a first predetermined pressure,
the pressure regulator is configured to gradually increase the pressure of the hydraulic oil from a low pressure lower than the first predetermined pressure to the first predetermined pressure, and then to a high pressure higher than the first predetermined pressure, in coupling of the frictional coupling element for starting the vehicle at the start of the vehicle, and
the lubrication control valve is configured to operate based on a differential pressure between the high pressure and a regulated pressure regulated by the pressure regulator, and to operate such that the lubricant oil is supplied to the frictional coupling element for starting the vehicle through the lubricant oil supplying circuit at a greater flow rate when the regulated pressure is lower than a second predetermined pressure set to be higher than or equal to the first predetermined pressure and lower than the high pressure, than when the regulated pressure is higher than or equal to the second predetermined pressure, in the coupling of the frictional coupling element for starting the vehicle at the start of the vehicle, wherein
the lubricant oil supplying circuit includes a large-diameter orifice-installed oil passage and a small-diameter orifice-installed oil passage connected in parallel with each other and respectively provided with a large-diameter orifice and a small-diameter orifice having orifice diameters different from each other,
the lubrication control valve is provided at the large-diameter orifice-installed oil passage and configured to allow communication of the large-diameter orifice-installed oil passage when the regulated pressure is lower than the second predetermined pressure, and to block the large-diameter orifice-installed oil passage when the regulated pressure is higher than or equal to the second predetermined pressure,
the small-diameter orifice-installed oil passage is configured to supply the lubricant oil through the small-diameter orifice-installed oil passage when the regulated pressure is higher than or equal to the first predetermined pressure, and
the lubricant oil supplying circuit is configured to supply the lubricant oil from both the large-diameter orifice-installed oil passage and the small-diameter orifice-installed oil passage when the regulated pressure is higher than or equal to the first predetermined pressure and lower than the second predetermined pressure, and to supply the lubricant oil only from the small-diameter orifice-installed oil passage, of the large-diameter orifice-installed oil passage and the small-diameter orifice-installed oil passage, when the regulated pressure is higher than or equal to the second predetermined pressure.

2. The hydraulically operated transmission of claim 1, wherein the frictional coupling element for starting the vehicle is a brake.

3. The hydraulically operated transmission of claim 1, wherein
the frictional coupling element for starting the vehicle is configured to be released through supply of hydraulic oil to a releasing hydraulic chamber, the releasing hydraulic chamber being provided such that a piston is interposed between the releasing hydraulic chamber and the coupling hydraulic chamber,
a switching valve for switching between supplying and not supplying the hydraulic oil to the releasing hydraulic chamber is provided,
the switching valve has a drain port for draining the hydraulic oil supplied to the lubrication control valve, the switching valve configured to supply the high pressure of the hydraulic oil to the lubrication control valve by blocking communication between the lubrication control valve and the drain port when the lubricant oil is not supplied to the releasing hydraulic chamber, the switching valve configured to allow communication between the lubrication control valve and the drain port when the hydraulic oil is supplied to the releasing hydraulic chamber, and the lubrication control valve is configured to supply the lubricant oil only from the small-diameter orifice-installed oil passage, of the large-diameter orifice-installed oil passage and the small-diameter orifice-installed oil passage, to the frictional coupling element for starting the vehicle when the high pressure of the hydraulic oil is supplied to the lubrication control valve from the switching valve when the switching valve allows communication between the lubrication control valve and the drain port.

4. A hydraulically operated transmission installed in a vehicle, the hydraulically operated transmission comprising:
  a frictional coupling element for starting the vehicle which includes a coupling hydraulic chamber and which is coupled through supply of a hydraulic oil to the coupling hydraulic chamber at start of the vehicle;
  a pressure regulator which regulates a pressure of the hydraulic oil supplied to the coupling hydraulic chamber in the frictional coupling element for starting the vehicle; and
  a lubrication control valve provided at a lubrication oil supplying circuit for supplying lubricant oil to the frictional coupling element for starting the vehicle, wherein
  the frictional coupling element for starting the vehicle is configured to be completely coupled when the pressure of the hydraulic oil is higher than or equal to a first predetermined pressure,
  the frictional coupling element is configured to be released through supply of the lubricant oil to a releasing hydraulic chamber, the releasing hydraulic chamber being provided such that a piston is interposed between the releasing hydraulic chamber and the coupling hydraulic chamber,
  a switching valve for switching between supplying and not supplying the hydraulic oil to the releasing hydraulic chamber and configured to supply the lubricant oil to the lubrication control valve is provided,
  the pressure regulator is configured to gradually increase the pressure of the hydraulic oil from a low pressure lower than the first predetermined pressure to the first predetermined pressure, and then to a high pressure higher than or equal to the first predetermined pressure, in coupling of the frictional coupling element for starting the vehicle at the start of the vehicle,
  the lubrication control valve is configured to operate based on a differential pressure between the high pressure and a regulated pressure regulated by the pressure regulator, and to operate such that the lubricant oil is supplied to the frictional coupling element for starting the vehicle through the lubricant oil supplying circuit at a greater flow rate when the regulated pressure is lower than a second predetermined pressure set to be higher than or equal to the first predetermined pressure and lower than the high pressure, than when the regulated pressure is higher than or equal to the second predetermined pressure, in the coupling of the frictional coupling element for starting the vehicle at the start of the vehicle,
  the switching valve has a drain port configured to drain the hydraulic oil supplied to the lubrication control valve, the switching valve configured to allow communication between the lubrication control valve and the drain port when the hydraulic oil is supplied to the releasing hydraulic chamber, and
  the lubrication control valve is configured to reduce a flow rate of the lubricant oil through the lubrication oil supplying circuit when the high pressure of the hydraulic oil supplied to the lubrication control valve is lowered.

* * * * *